May 31, 1960  C. A. JUDSON ET AL  2,938,659
ELASTIC-FLUID TURBINES

Filed Aug. 26, 1957  2 Sheets-Sheet 2

INVENTOR
CHARLES A. JUDSON
ERIC KELLETT
By Norris & Bateman
Attorneys

United States Patent Office 2,938,659
Patented May 31, 1960

2,938,659

ELASTIC-FLUID TURBINES

Charles Alan Judson, Solihull, and Eric Kellett, Birmingham, England, assignors to The Birmingham Small Arms Company Limited, Birmingham, England Filed Aug. 26, 1957, Ser. No. 680,039

Claims priority, application Great Britain Sept. 6, 1956

4 Claims. (Cl. 230—116)

This invention relates to elastic-fluid turbines of the kind wherein the driven rotor is connected to a centrifugal compressor and is driven by hot gases, for example, exhaust gases from an internal combustion engine, the compressor being used to supercharge the engine and compress a mixture of fuel and air supplied to the combustion chamber(s) of the engine.

In order to conserve space and power, the centrifugal compressor rotor is direct-coupled to the turbine rotor and is separated from the rotor only by bearings for the coupling member. Efficient operation of the centrifugal compressor is dependent to some extent on the coolness of the mixture being compressed, and in any case it is desirable that the temperature of the compressed mixture should not be excessively high.

It is therefore an object of this invention to provide means for reducing heat transfer to the compressor from the hot gases used to drive the turbine rotor and from parts in contact with the hot gases.

A turbine of the specified kind in accordance with the invention has a turbine-rotor casing having a flange adapted to be connected to a corresponding flange of the compressor body, the engaging surface of the casing flange being interrupted whereby transfer of heat from the turbine casing to the compressor body is reduced.

The corresponding flange of the compressor body may likewise be interrupted, for the same purpose.

Preferably, the two flanges are connected together with a corresponding flange of a part of the turbine body which supports the turbine casing and bearing housing, interposed between them.

The flange of the turbine casing is preferably castellated circumferentially, radially wider portions of the flange being provided with apertures for accommodation of bolts for connection of the flange to the compressor body flange.

The flange of the compressor body may have circumferentially spaced arcuate grooves or slots or alternatively may have a continuous circumferential groove or slot.

The said turbine body part may be provided with a baffle arranged more or less radially relative to the axis of the coupling member connecting the turbine and compressor rotors, whereby transfer of heat from the hot gases employed to drive the turbine rotor and from parts of the turbine in contact with the hot gases is reduced.

The radial surfaces of the baffle are preferably made reflecting in order to reduce transfer of heat by radiation.

Figure 1:
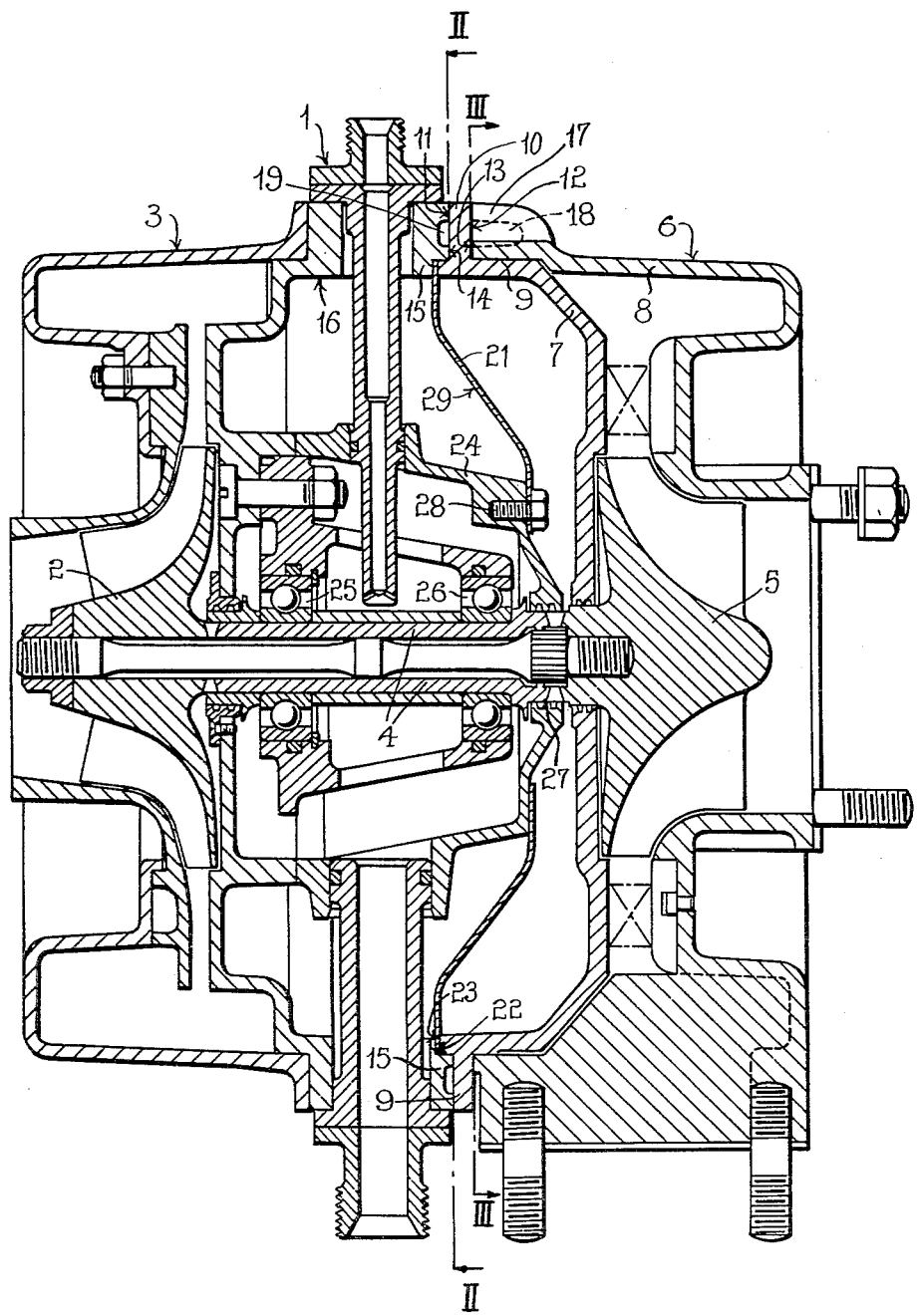
Figure 2:
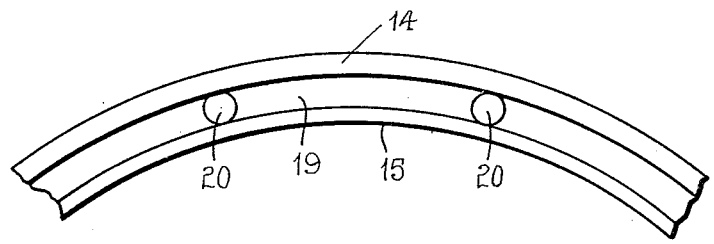
Figure 3:
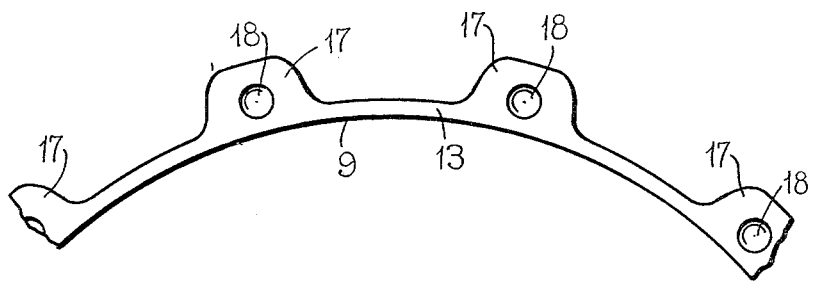

In the accompanying drawings, which illustrate a constructional example according to the invention, Figure 1 is a side view in medial section of a turbine-driven supercharger for an internal combustion engine, Figure 2 is a fragmentary detached section taken on line II—II of Figure 1, and Figure 3 is a view similar to Figure 2 but taken on line III—III of Figure 1.

Figures 2 and 3 are drawn to a larger scale than that of Figure 1.

Referring to the drawings, in the construction shown therein, we provide a turbine-driven supercharger 1 for supercharging an internal combustion engine wherein the rotor 2 of a centrifugal compressor 3 for supercharging is mounted at one end of a shaft 4 having the rotor 5 of a turbine 6 mounted on its other end, the turbine rotor 5 being driven by exhaust gases from the internal combustion engine. The turbine 6 has a body part 7 supporting a casing 8 having an annular flange 9 whose engaging surface is radial to the axis of the shaft 4. The turbine body part 7 has an annular flange 10 having opposed engaging surfaces 11 and 12 respectively, the surface 12 being engaged by a surface 13 of the casing flange 9 and the surface 11 being engaged by a surface 14 of annular flange 15 of the body 16 of the compressor 3. The engaging surfaces 14 of the turbine casing flange 9 is circumferentially castellated, see Figure 3, providing a plurality of equally spaced portions 17 of greater radial width, each portion 17 being provided with a tapped aperture 18 in the flange 9. The annular flange 15 of the compressor body is provided in its surface 14 with a continuous circumferential groove 19, see Figure 2. Alternatively, the surface 14 of the annular flange 15 of the compressor body 16 may be provided with an interrupted circumferential groove. The compressor body flange 15 is provided with clearance apertures 20 registering with the screwthreaded apertures 18 of the turbine casing flange 9. The engaging surfaces 11, 12 of the flange 10 of the turbine body part 7 are plane and the flange 10 is provided with registering clearance apertures (not shown). The flanges 9, 10 and 15 are connected by headed bolts or studs (not shown) extending through the clearance apertures 20 of the compressor body flange 15 and the clearance apertures of the turbine body part flange 10 and engaging the screwthreaded apertures 18 of the turbine casing flange 9. The provision of the castellations in the turbine casing flange 9 and the continuous or interrupted groove in the compressor body flange 15 serve materially to reduce the amount of heat transferred by conduction from the turbine casing 8, which is heated by the hot gases employed to drive the turbine rotor 5, and from the turbine body part 7, which is heated by the same source to a lesser degree, to the compressor body 16, thereby resulting in more efficient operation of the compressor 3 and in less pre-heating of the fuel/air mixture compressed thereby.

In order still further to reduce the amount of heat transferred from the turbine to the compressor, a more or less radially extending baffle plate 21 is provided within the assembly and extending so as to partition off the turbine 6 from the compressor 3. The outer peripheral edge portion of the baffle plate 21 is interposed between a relieved annular surface 22 of the compressor body flange 15 and a projecting annular surface 23 of the turbine body part flange 9, engagement of these surfaces 22 and 23 with the baffle plate 21 on bolting of the flanges 9, 10 and 15 together serving to support the baffle plate 21 in its operative position. The inner peripheral edge of the baffle plate 21 makes contact with and is secured by spaced bolts (one of which is shown in Figure 1 and designated 28) to a portion 24 of the body of the turbine 6 which houses the bearings 25, 26 for the shaft 4 and also contacts the shaft 4 at 27. The baffle plate 21 is of aluminium or other metal of high reflectivity or is otherwise formed so that its surfaces reflect, whereby heat radiated from the hot gases or from parts in contact therewith is intercepted and mostly reflected back and prevented from being absorbed by the compressor 3. The re-radiation of such small quantity of heat radiation as may be absorbed by the baffle plate 21 or of heat supplied to it by conduction from the turbine body part flange is materially reduced by the fact that its surface 29 which faces the compressor 3 is a reflecting one.

We claim:

1. In a turbosupercharger for an internal combustion engine, having a turbine rotor adapted to be driven by hot exhaust gases from said combustion engine and a compressor rotor directly coupled to said turbine rotor by a common shaft and adapted for supercharging said engine; a housing for said turbine and compressor rotors including a compressor body portion enclosing said compressor rotor, a turbine casing enclosing said turbine rotor in a turbine body portion axially positioned between said turbine casing and said compressor body portion, and means for rigidly joining said casing and said body portions together as a unit and for effectively thermally isolating said compressor body portion from the heat of hot exhaust gases imparted to said turbine casing and said turbine body portion comprising: means providing an annular radially extending compressor body flange rigid with said compressor body portion and formed with a smooth radial wall surface adjacent to and facing said turbine casing and body portion, means providing a radially extending castellated annular turbine casing flange rigid with said turbine casing in axial spaced relationship to said compressor body flange and having a smooth radial wall surface axially opposing said wall surface of said compressor body flange and angularly spaced uniform radially raised portions formed with threaded apertures extending inwardly from the wall surface opposing said compressor body flange, means providing a smooth sided annular radially extending turbine body flange rigid with said turbine body and projecting between said compressor body flange and said turbine casing flange in abutting relationship with the opposed wall faces of said compressor body flange and said turbine casing flange, fastening elements fixedly received in said threaded apertures, and axially extending through said turbine and compressor body flanges for rigidly joining said flanges together as a unit, and means defining a circumferential groove in said wall surface of said compressor body flange abutting said turbine body flange to provide for an axially reduced cross-section.

2. The turbosupercharger as defined in claim 1 wherein said turbine body flange defines an enclosed annular chamber with said circumferential groove in said wall surface of said compressor body flange and wherein means are provided for positioning said fastening elements so that they extend through said chamber.

3. The turbosupercharger as defined in claim 1 wherein said circumferential groove is continuous.

4. The turbosupercharger as defined in claim 1 wherein said circumferential groove is interrupted.

References Cited in the file of this patent

UNITED STATES PATENTS

| | | |
|---|---|---|
| 652,816 | Snyder | July 3, 1900 |
| 683,485 | Osbourn | Oct. 1, 1901 |
| 2,577,134 | Land | Dec. 4, 1951 |
| 2,578,785 | Davis | Dec. 18, 1951 |
| 2,646,210 | Kohlmann et al. | July 21, 1953 |
| 2,703,674 | Wood | Mar. 8, 1955 |

FOREIGN PATENTS

| | | |
|---|---|---|
| 303,760 | Switzerland | Feb. 16, 1955 |
| 757,591 | Great Britain | Sept. 19, 1956 |